United States Patent
Nayyar et al.

(10) Patent No.: US 8,698,539 B1
(45) Date of Patent: Apr. 15, 2014

(54) INTERFERENCE MITIGATION IN MIXED SIGNAL INTEGRATED CIRCUITS (ICS)

(71) Applicant: Texas Instruments Incorporated, Dallas, TX (US)

(72) Inventors: Jasbir Singh Nayyar, Ludhiana (IN); Sreenath Narayanan Potty, Trivandrum (IN); Mukesh Kumar, Bangalore (IN); Vivek Singhal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/739,228

(22) Filed: Jan. 11, 2013

(51) Int. Cl.
*G06F 1/04* (2006.01)

(52) U.S. Cl.
USPC .......................................... 327/291; 327/298

(58) Field of Classification Search
None
See application file for complete search history.

(56) References Cited

U.S. PATENT DOCUMENTS

| | | | | |
|---|---|---|---|---|
| 7,391,348 B2* | 6/2008 | Lukoff | | 341/118 |
| 7,667,517 B2* | 2/2010 | Iler | | 327/291 |
| 8,552,784 B2* | 10/2013 | Fujisawa et al. | | 327/291 |
| 2004/0113660 A1* | 6/2004 | Karasudani | | 326/136 |
| 2005/0227664 A1* | 10/2005 | Wu | | 455/333 |
| 2007/0188369 A1* | 8/2007 | Itagaki | | 341/156 |
| 2009/0055677 A1* | 2/2009 | Chen | | 713/600 |
| 2012/0154010 A1* | 6/2012 | Singhal et al. | | 327/299 |

* cited by examiner

*Primary Examiner* — Tuan T Lam
(74) *Attorney, Agent, or Firm* — Ronald O. Neerings; Wade James Brady; Frederick J. Telecky, Jr.

(57) ABSTRACT

A clock generation circuit in an IC is provided for mitigating signal interferences caused by an aggressor block operable on a first clock signal with a frequency range of a victim block. The clock generation circuit includes a gating circuit configured to perform gating of a second clock signal to generate a third clock signal based on control signal. An average frequency of the third clock signal is substantially matched to a frequency of the first clock signal, and harmonics of the third clock signal do not interfere with the frequency range of the victim block. The clock generation circuit further includes a FIFO buffer circuit configured to receive the first clock signal as a write clock and the third clock signal as read clock, and a control circuit for generating the control signal based on an occupancy level of FIFO buffer circuit and a plurality of random numbers.

20 Claims, 7 Drawing Sheets

INTERFERENCE MITIGATION IN MIXED SIGNAL INTEGRATED CIRCUITS (ICS)

TECHNICAL FIELD

The present disclosure generally relates to signal interference mitigation in mixed signal Integrated Circuits (ICs).

BACKGROUND

In mixed signal Integrated Circuits (ICs), or particularly in System on Chip (SOC) circuits, several blocks are integrated in a single chip. Mixed-signal ICs are chips that include both digital and analog circuits on the same chip. For example, a single chip may be designed with different radio subsystems, including Global Positioning Systems (GPSs), Bluetooth systems, Wireless Local Area Network (WLAN) systems, and Frequency Modulation (FM) radio systems.

In such ICs, spurs caused by digital switching in underlying circuits may create co-existence issues among the blocks designed in the ICs. For example, switching transients in digital Metal Oxide Semiconductor (MOS) circuits perturb analog circuits integrated on the same die by means of coupling through the substrate. If the spurs due to digital switching in an aggressor block lie in the band of interest of a victim block, it may degrade performance of a radio circuitry of the victim block, As a possible solution, finding a unique frequency which is friendly to all radio circuitries in the ICs, is difficult.

SUMMARY

This summary is provided to comply with 37 C.F.R. §1.73, requiring a summary of the present technology briefly indicating the nature and substance of the present technology. It is submitted with the understanding that it will not be used to interpret or limit the scope or meaning of the claims.

A number of exemplary Integrated Circuit (ICs) and circuits, configured for mitigating interferences caused between various blocks in the ICs are disclosed. In an embodiment, a clock generation circuit in an IC is provided for managing signal interferences caused by at least one aggressor block capable of being operated on a first clock signal in the IC with a frequency range of at least one victim block in the IC. The clock generation circuit includes a gating circuit configured to perform gating of a second clock signal to generate a third clock signal based on one or more control signals. The second clock signal is of higher frequency than the first clock signal and an average frequency of the third clock signal is substantially matched to a frequency of the first clock signal, and wherein one or more harmonics of the third clock signal do not interfere with the frequency range of the at least one victim block.

The clock generation circuit further includes a First In First Out (FIFO) buffer circuit coupled with the gating circuit that is configured to receive the first clock signal as a write clock and the third clock signal as a read clock. The FIFO buffer circuit includes a read pointer clocked by the third clock signal and a write pointer clocked by the first clock signal. The clock generation circuit further includes a control circuit coupled with the gating circuit. The control circuit is configured to generate the one or more control signals based on an occupancy level of FIFO buffer circuit and a plurality of random numbers, wherein the occupancy level of the FIFO buffer circuit is based on the read pointer and the write pointer.

In an embodiment, an IC is disclosed. The IC includes at least one aggressor block capable of being operated on a first clock signal and at least one victim block capable of being operated on a frequency range. At least one harmonic of a frequency of the first clock signal may interfere with the frequency range. The IC further includes a gating circuit configured to perform gating of a second clock signal to generate a third clock signal based on one or more control signals. The second clock signal is of higher frequency than the first clock signal and an average frequency of the third clock signal is substantially matched to a frequency of the first clock signal, and wherein one or more harmonics of the third clock signal do not interfere with the frequency range of the at least one victim block.

The IC further includes a data hand-off circuit coupled with the gating circuit. The data hand-off circuit includes a FIFO buffer circuit coupled with the gating circuit that is configured to receive the first clock signal as a write clock and the third clock signal as a read clock. The FIFO buffer circuit includes a read pointer clocked by the third clock signal and a write pointer clocked by the first clock signal. The data hand-off circuit further includes a control circuit coupled with the gating circuit. The control circuit is configured to generate the one or more control signals based on an occupancy level of FIFO buffer circuit and a plurality of random numbers, where the occupancy level of the FIFO buffer circuit is based on the read pointer and the write pointer.

Other aspects and example embodiments are provided in the drawings and the detailed description that follows.

DETAILED DESCRIPTION

Pursuant to an exemplary scenario, a mixed signal IC may include a plurality of blocks including analog and digital components. Unfortunately, while the ability to incorporate multiple analog components such as radio components on a single chip enables smaller devices with greater functionality, doing so can also be the source of certain limitations. For example, in mixed signal ICs, toggling a digital circuit corresponding to a block causes spurs that interfere with analog circuits of other blocks in the mixed signal IC. Such interference can result in significant performance degradation of victim blocks in the mixed signal IC.

Figure 1A:
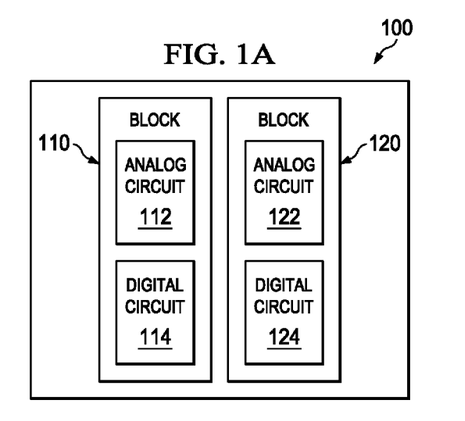
FIGS. 1A and 1B illustrate a schematic representation of blocks of an IC having signal interference therein according to an exemplary scenario.
Figure 1B:
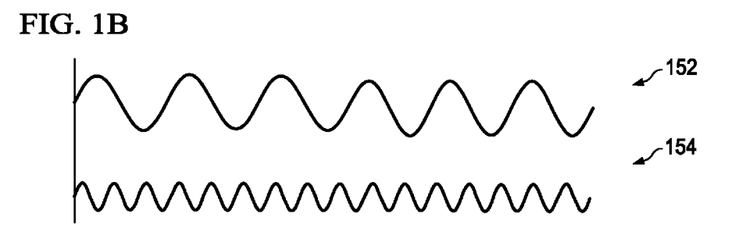

An explanation of this phenomenon will now be provided with reference to FIGS. 1A and 1B, which includes an exemplary representation of an IC 100 including a block 110 and a block 120. The blocks 110 and 120 may be any Intellectual Property (IP) blocks or circuit combinations for specific components including, but not limited to, Bluetooth, Wireless Local Area Network (WLAN), Frequency Modulation (FM) radio and Global Positioning System (GPS). Each of the blocks 110 and 120 may include digital and/or analog components. For example, the block 110 may include an analog circuit 112 and a digital circuit 114 for the GPS, and the block 120 may include an analog circuit 122 and a digital circuit 124 for the FM radio.

The digital circuit 114 for the GPS operates at a clock frequency of 32 Mega Hertz (MHz) (shown as 152 in FIG. 1B), and the analog circuit 122 for the FM radio operates at a frequency range of 88-108 MHz. However, due to periodic switching of the digital circuit 114 (associated with the GPS at 32 MHz), a third harmonic is induced through a power supply and/or ground network. The third harmonic centres around 96 MHz (shown as 154 in FIG. 1B), which lies in the operating frequency range (88-108 MHz) of the analog circuit 122 for the FM radio. Accordingly, this third harmonic can interfere with analog circuit 122 associated with the FM radio, and may result in de-sense for the FM radio.

Figure 2A:
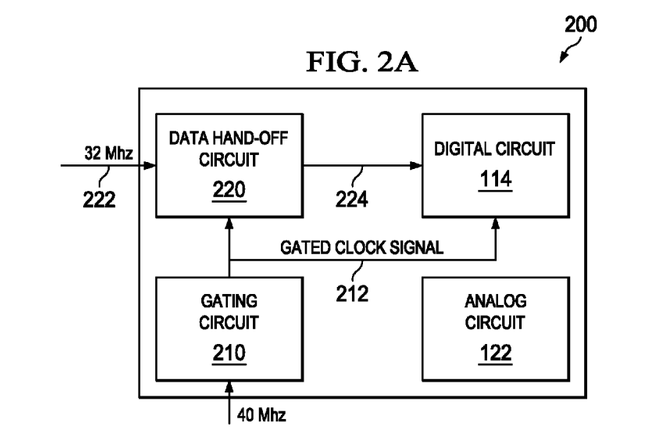
FIGS. 2A and 2B illustrate a schematic representation of a scheme of mitigation of the signal interference in the IC of FIG. 1A according to an exemplary scenario.
Figure 2B:
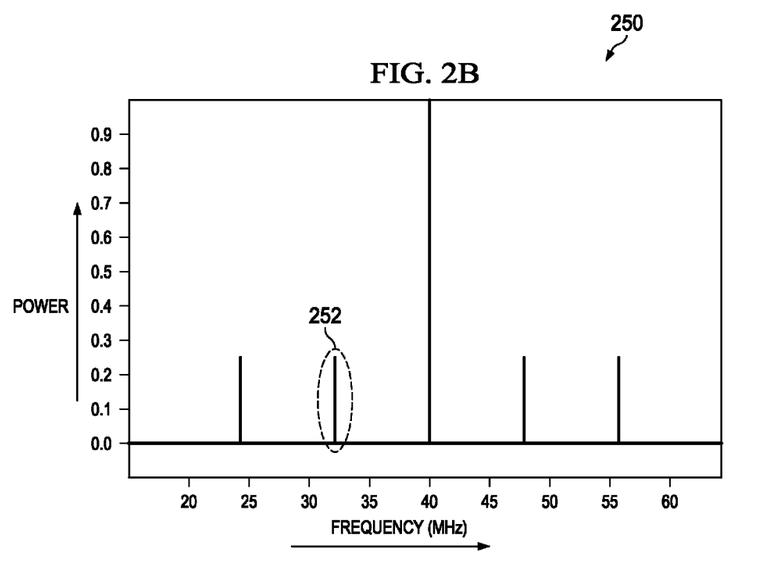

Referring now to FIGS. 2A and 2B, an exemplary technique of a clock gating to mitigate interference in an IC 200 is shown. The IC 200 includes an aggressor block such as the digital circuit 114 and a victim block such as the analog circuit 122. As shown in FIG. 2A, the digital circuit 114 is provided with a gated clock signal that is matched to its operating clock frequency (for example, 32 MHz), instead of providing a 32 MHz clock signal. For instance, a gating circuit 210 is configured to perform gating of a clock signal that has a higher frequency than an operating clock frequency of the digital circuit 114. The harmonics of the gated clock signal do not fall within the operating frequency range of the analog circuit 122. Herein, the term an 'operating clock frequency' refers to a clock frequency that is originally intended to be provided to the aggressor block in the IC. The operating clock frequency of the aggressor block may have some harmonics interfering with the operating frequency range of the victim block.

In the example shown in FIG. 2A, if the operating clock frequency for the digital circuit 114 is 32 MHz, a higher frequency clock signal (such as 40 MHz) is periodically gated such that an average frequency of the gated clock signal is substantially matched to 32 MHz. For instance, the gating circuit 210 is configured to gate every fifth clock cycle of the 40 MHz clock signal, and the resultant gated clock signal (see, 212) is provided to the digital circuit 114. As shown in FIG. 2A, a data hand-off circuit 220 is configured to receive data (see, 222) at the operating clock frequency of 32 MHz, and its output (see, 224) is provided to the digital circuit 114. The data hand-off circuit 220 may be a First-In, First-Out (FIFO) device or buffer that may be configured to write data at 32 MHz and read data at the frequency of the gated clock signal 212.

A plot 250 representing a Fast Fourier Transform (FFT) diagram of the gated clock signal 212 is shown in FIG. 2B. As shown in the plot 250, the strongest frequency component is at 40 MHz, however, a significant power is also centered at 32 MHz (see, 252) as well, and it can still cause interference with the victim blocks such as the analog circuit 122.

The present disclosure provides solutions for clock gating that minimize the impact of interference caused by the gated clock signal and these solutions overcome these and other limitations, in addition to providing currently unavailable benefits. Various embodiments of clock gating to generate gated clock signals that have average frequency substantially matching to the operating clock frequency of the aggressor blocks, will be described in conjunction with FIGS. 3-8.

Figure 3:
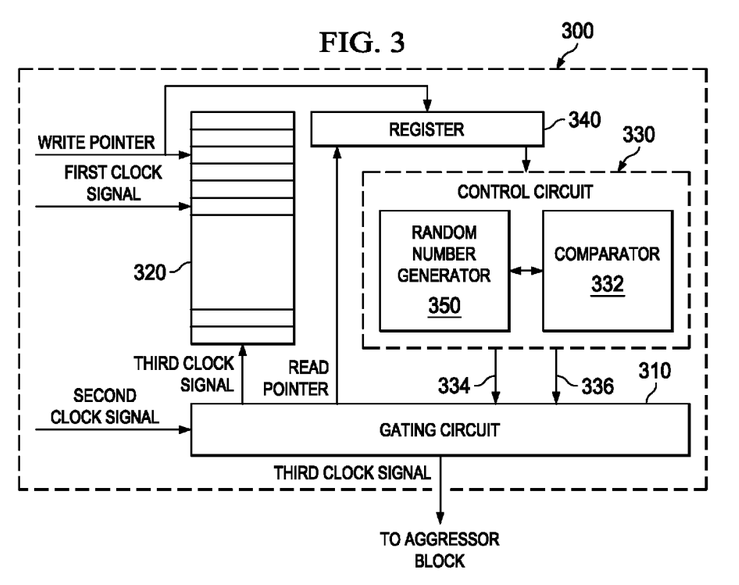
FIG. 3 is a block diagram of a clock generation circuit for generation of a third clock signal in accordance with an embodiment.

FIG. 3 illustrates a block diagram of a clock generation circuit 300 that can be utilized in an IC such as the IC 100 or the IC 200 for mitigating various co-existence issues (for example, signal interference) associated with aggressor blocks and victim blocks in the IC, according to an embodiment. The clock generation circuit 300 is configured to generate a gated clock signal to be used by an aggressor block such that the harmonics of the gated clock signal do not interfere with the operating frequency range of the victim blocks in the IC. For instance, the clock generation circuit 300 is configured to reduce the effects of interfering harmonics of a first clock signal (the operating clock frequency of the aggressor block such as the digital circuit 114) by providing a third clock signal to the aggressor block as operating clock signal, where the third clock signal is generated by randomly gating some clock cycles of a second clock signal such that the third clock signal has an average frequency substantially matching to that of the first clock signal. The second clock signal has a clock frequency higher than the first clock signal and some cycles of the second clock signal is randomly gated such that the third clock signal (that has an average frequency substantially matched to the frequency of the first clock signal) is generated. The third clock signal is provided to the aggressor block and accordingly, the harmonics of the third clock signal generated by the aggressor block (such as the digital circuit 114) do not interfere with the operating frequency range of the victim blocks (such as the analog circuit 122) in the IC.

The clock generation circuit 300 includes a gating circuit 310, a FIFO buffer circuit 320 and a control circuit 330. The gating circuit 310 is configured to receive the second clock signal (that has a higher frequency than the first clock signal) and is configured to perform controlled random gating of the second clock signal such that the average frequency of the resultant clock signal (the third clock signal) is substantially matched to the first clock signal. For example, if the first clock signal (the intended clock signal) for the aggressor block (for example, the digital circuit 114) is 32 MHz, the gating circuit 310 may be fed with a 40 MHz clock signal (the second clock signal). The gating circuit 310 is configured to perform random gating of some clock cycles of the 40 MHz clock signal such that a resultant average 32 MHz clock signal (the third clock signal) is generated. Accordingly, the resultant average 32 MHz clock signal is utilized for operating the digital circuit 114.

In various embodiments, the random controlled gating of the second clock signal is performed by the gating circuit 310 based on one or more control signals generated from the control circuit 330. The control circuit 330 is coupled with the FIFO buffer circuit 320. The control circuit 330 is configured to generate the control signals based on an occupancy level of the FIFO buffer circuit 320 and a plurality of random numbers. The FIFO buffer circuit 320 comprises a FIFO buffer (not shown) where data may be written at a write clock and from where data may be read at a read clock. The first clock signal is fed to the FIFO buffer as the write clock, and the third clock signal generated from the gating circuit 310 is fed as the read clock to the FIFO buffer. The FIFO buffer circuit 320 includes a read pointer and a write pointer, where the read pointer specifies an address for reading data from the FIFO buffer and the write pointer specifies an address for writing data into the FIFO buffer.

In an embodiment, the clock generation circuit 300 includes a register 340 that is configured to store the occupancy level of the FIFO buffer circuit 320. In some embodiments, the register 340 may be a part of the FIFO buffer circuit 320. The occupancy level of the FIFO buffer circuit 320 may be determined based on the read pointer and the write pointer. For instance, the occupancy level may be determined based on the difference between the addresses specified in the write pointer and the read pointer.

In an embodiment, the control circuit 330 includes a comparator 332 that is configured to compare the occupancy level of the FIFO circuit 320 with one or more thresholds. In an embodiment, the comparator 332 may be a multi-level comparator, for example, a four level comparator. The four level comparator is configured to compare the occupancy level of the FIFO buffer circuit 320 with a first threshold T1, a second threshold T2, a third threshold T3 and a fourth threshold T4. In some embodiments, the comparator 332 may be able to perform more or fewer than four comparisons at a time.

In an embodiment, if the occupancy level of the FIFO buffer circuit 320 is between the first threshold T1 and the second threshold T2, the one or more control signals (see, 334) generated by the control circuit 330 comprise a signal corresponding to a clock gating state, and this signal is provided to the gating circuit 310. The gating circuit 310 is configured to gate a current cycle of the second clock signal (upon receiving the signal corresponding to the clock gating state) to generate the third clock signal based on a comparison of a random number with a gating threshold. Such period of gating the second clock signal to provide the third clock signal may be termed as a 'gating period'.

In an embodiment, the control circuit 330 includes a random number generator 350 that is configured to generate a plurality of random numbers. Example of the random number generator 350 may include, but is not limited to a Linear Feedback Shift Registers (LFSR) based random number generator. The random number generator 350 may operate on the second clock signal and generate a random number on each rising or falling edge of the second clock signal. In an embodiment, the current cycle of the second clock signal may be gated to generate the third clock signal based on comparison of a random number generated at the current cycle with the gating threshold.

In an embodiment, the generation pattern of the random numbers and the gating threshold may be selected based on frequencies of the first clock signal and the second clock signal. For instance, in the example of the first clock signal being of 32 MHz frequency and the second clock signal being of 40 MHz frequency, some output bits (for example five) of the random numbers generator 350 may be selected and these output bits may be compared with the gating threshold. As such, if the random numbers (binary values of the output bits) are normalized between 0 and 1, and the gating threshold is selected as 0.8, it is noted that the probability of gating of a current cycle of the second clock signal is ⅕, Accordingly, a probable average frequency of the third cock signal may be 32 MHz (e.g., obtained by multiplying 0.8 and 40). Accordingly, based on an average frequency of the third clock signal and the second clock signal, the gating threshold may be selected. For instance, for generating a third clock signal having average frequency of 20 MHz, the gating threshold may be selected as substantially equal to 0.5.

In an embodiment, if the random number at the current cycle is greater than the gating threshold, the control circuit 330 may assert a gating signal (see, 336) and provide the asserted gating signal to the gating circuit 310. Accordingly, if the gating circuit 310 receives the signal corresponding to the 'clock gating state' and the asserted gating signal 336, the gating circuit 310 is configured to gate the current cycle of the second clock signal to generate the third clock signal. Further, if the random number at the current cycle is less than the gating threshold, the control circuit 330 may de-assert the gating signal 336 and provide the de-asserted gating signal 336 to the gating circuit 310. Accordingly, in the gating period (when the control signal 334 includes a signal corresponding to the 'clock gating state'), if the gating circuit 310 receives the de-asserted gating signal 336, the gating circuit 310 does not gate the current cycle of the second clock signal to generate the third clock signal. Further, in the gating period, if the gating circuit 310 receives the asserted gating signal 336, the gating circuit 310 performs gating of the current cycle of the second clock signal to generate the third clock signal.

In an embodiment, if the occupancy level of the FIFO buffer circuit 320 exceeds the second threshold T2 (such occupancy level may be termed as an 'overflow condition'), the control signals (334) generated by the control circuit 330 comprise a signal corresponding to the 'ungated clock state'. As the gating circuit 310 receives the signal corresponding to the 'ungated clock state', the gating circuit 310 provides the ungated second clock signal (for example, a raw second clock signal) as the third clock signal. As such, the ungated second clock signal has higher signal frequency as compared to the first clock signal, the read operation of the FIFO buffer is performed at a rate faster than the write operation that results into a decrease in the occupancy level. Such period during which the third clock signal is same as the ungated second clock signal, is termed as a 'burst mode period'. Accordingly, as the signal corresponding to the 'ungated clock state' is asserted, the 'burst mode period' is activated, and is continued till the occupancy level of the FIFO buffer becomes equal to the third threshold T3 (for example, 2).

In one embodiment, as the occupancy level of the FIFO buffer becomes less than the third threshold T3 (this occupancy level may be termed as an 'underflow condition') during the 'burst mode period', the control circuit 330 is configured to de-assert the signal corresponding to the 'ungated clock state', and generate the control signal 334 that include a signal corresponding to a 'clock disable state'. As the gating circuit 310 receives the signal corresponding to the 'clock disable state', a constant or non-switching signal may be provided as the third clock signal. Such period of providing the constant or non-switching signal as the third clock signal may be termed as 'no clock period' or 'no read period'. During the 'no clock period', the read operation from the FIFO buffer is not performed and only the writing operation is performed, thereby causing the occupancy level of the FIFO buffer to increase.

Further, as the occupancy level exceeds the first threshold T1, the signal corresponding to the 'clock gating state' is asserted (and the signal corresponding to the 'clock disable state' is de-asserted), and the 'gating period' is activated, where the gated second clock signal is provided as the third clock signal based on comparison of the random numbers with the gating threshold. In some embodiments, a maximum occupancy level of the FIFO buffer may be set as equal to the fourth threshold T4 that is more than the T1, T2 and T3. Due to asynchronous nature of read and write operations in the FIFO buffer, the fourth threshold T4 is selected that is slightly more than the threshold T2. For instance, the T4 acts as a safety overhead from the overflow condition. Similarly, due to asynchronous nature of read and write operations in the FIFO buffer, the third threshold T3 is selected that is slightly lower than the first threshold T1. For instance, the T3 acts as safety overhead in the underflow condition.

In some embodiments, there may be more thresholds that can be used to be compared with the random numbers for the generation of the third clock signal from the second clock signal. For instance, there may be a threshold between the thresholds T2 and T4, and by using such threshold, probability of gating of a current cycle may be adjusted, thereby adjusting the length of the random gating period. Similarly, there may be another threshold between the thresholds T1 and T3. Using these thresholds, a desired length of the gating period (in which the second clock signal is gated) may be controlled. For example, the thresholds may be selected such that the random gating period may be prolonged.

In some embodiments, the thresholds T1 and/or T2 may be varied randomly instead of being fixed. Without limiting to the scope of the present technology, value of T1 may be selected randomly from a range, e.g. from 2 to 5, and value of T2 may be selected randomly from a range, e.g. from 10 to 16. It should be noted that the example values of T1 and T2 such as 2 to 5 and 10 to 16 are example values only and may different values as well. The values of T1 and T2 may be selected randomly from the specified ranges such that a length of the gating period may be controlled. For instance, if the value of T2 may be 12 in a current cycle, the T2 may be selected as greater than 12, for example, 14 in the next cycle, in order to increase a length of the gating period.

Figure 4:
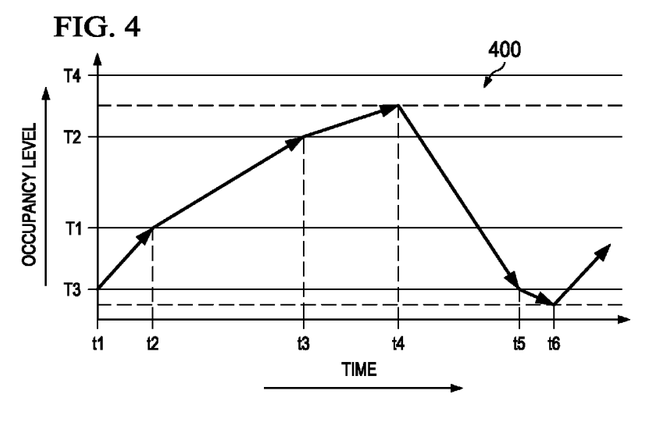
FIG. 4 is a plot illustrating various time periods associated with generation of the third clock signal according to an embodiment.

Referring now to FIG. 4, a plot 400 is shown illustrating various time periods associated with generation of the third clock signal according to an embodiment. The plot 400 shows various stages of generation of third clock signal along the occupancy level of the FIFO buffer (on Y axis) and time (on X-axis).

As shown in plot 400, during the time 't1' and 't2' (the 'no clock period' or underflow condition), the occupancy level is less than the first threshold T1. In this period, the gating circuit 310 is configured to provide a constant or non-switching signal (as the third clock signal) to the read clock of the FIFO buffer circuit 320. As no read clock is provided to the FIFO buffer circuit 320, the occupancy level of the FIFO buffer increases towards the first threshold T1 (as T1 is greater than T3).

Further, during the time 't2' and 1.3' (the 'gating period'), as the occupancy level of the FIFO buffer becomes greater than the first threshold T1 (but still less than the second threshold T2 (T2 being greater than T1)), the gating circuit 310 is configured to provide the gated second clock signal as the third clock signal. As described in reference to FIG. 3, a decision to gating or not gating a current cycle of the second clock signal is decided based on a comparison of a random number generated at the current cycle and the gating threshold.

In an embodiment, the one or more random numbers and the gating decision may be based on values of the first clock frequency and the second clock frequency. For instance, in one embodiment, random number with n values (e.g. 0 to 5 when n=6) may be generated, where n depends on the ratio of the second clock frequency and the first clock frequency. In an example that is non-limiting to the scope of the present technology, if the first clock frequency is 32 MHz and the second clock frequency is 40 MHz, there may be random number in the range 0 to 4 generated and the gating may be chosen such that one random clock cycle of every five clock cycles of the second clock signal is gated. In one embodiment, gating is chosen based on comparing random number with a clock cycle phase of the second clock signal. For instance, if random number is 3, $4^{th}$ clock cycle of the second clock signal is gated, and if the random number is 1, $2^{th}$ clock cycle of the second clock signal is gated. In another example, if the first clock frequency is 25 MHz and the second clock frequency is 30 MHz, random numbers with six possible values may be generated and the gating may be chosen such that one random clock cycle of the every six clock cycles of the 30 MHz signal is gated. Accordingly, for each current cycle of the second clock signal, a decision whether to gate or not gate the current cycle of the second clock signal is dependent upon the random number generated by the random number generator. Also, in such manner, for any frequency combination of the first and second clock signals, gating can be performed based on comparison of the random number with clock phases.

Further, after the time t3 (the 'burst mode period'), as the occupancy level of the FIFO buffer exceeds the second threshold T2, the 'burst mode period' is activated. The gating circuit 310 is configured to generate the third clock signal that is same as the ungated second clock signal. As the read clock (the ungated second clock signal) of the FIFO buffer becomes higher than the write clock, the occupancy level of the FIFO buffer reduces. The 'burst mode period' is shown between time t3-t4 and time t4-t5. It is noted that during the time t3 and t4, the occupancy level of the FIFO buffer may increase from the level T2, due to asynchronous nature of the current read clock and the write clock of the FIFO buffer.

During the period t4 to t5 of the 'burst mode period', the ungated second clock signal is provided to the read clock of the FIFO buffer, and the occupancy level of the FIFO buffer reduces to the third threshold T3. In an embodiment, the third threshold T3 may be selected as 2 or any other number. As the occupancy level reaches to the third threshold T3, the 'no clock period' is activated. In some embodiments, there may be a latency in the activation of the 'no clock period' due to asynchronous nature of read clock and write clocks of the FIFO buffer, causing a burst residue read of the FIFO buffer to be performed (see, the time between t5 and t6).

Further, after time t6, no read clock is provided to the FIFO buffer (as the third clock signal is a constant signal or a 'non-switching signal') causing the occupancy level to increase toward the first threshold T1. As the occupancy level exceeds the first threshold T1, the 'gating period' is activated and the gated second clock signal is provided as the third clock signal. It should be noted that the generation of the random numbers by the random number generator 350 and the selection of the 'gating period' may be performed such that the occupancy level of the FIFO buffer remain in the 'gating period' for majority of the time of generation of the third clock signal.

Figure 5:
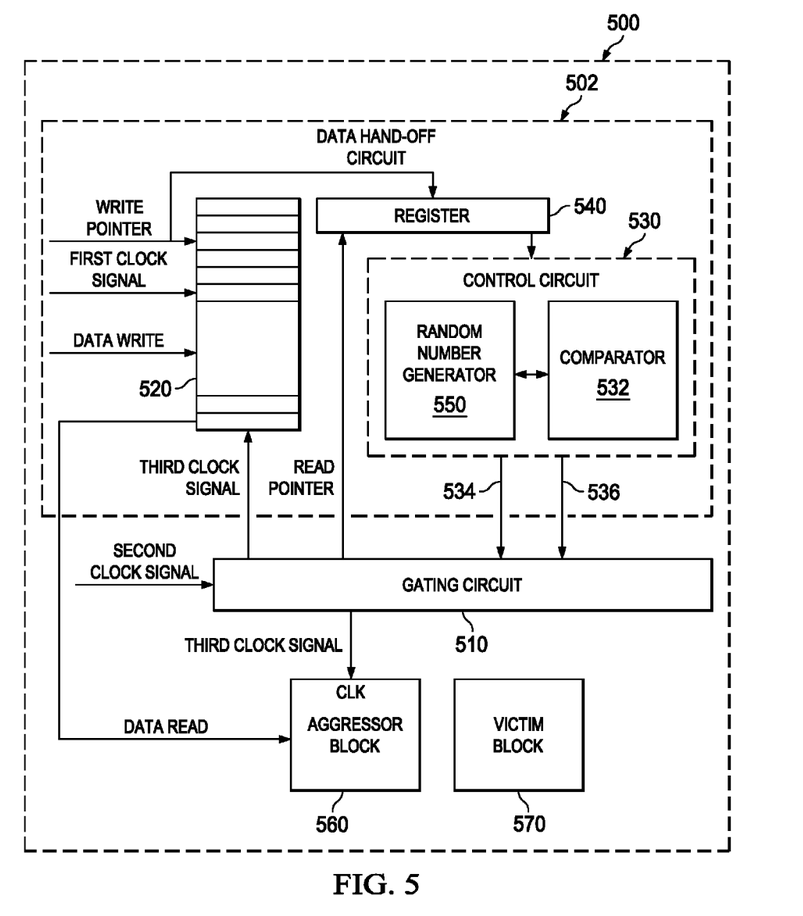
FIG. 5 is a block diagram of an IC for mitigating signal interferences within aggressor blocks and victim blocks of the IC according to an embodiment.

Referring now to FIG. 5, a block diagram of an IC 500 representing generation of a third clock signal (that is an average matched clock signal to the first clock signal) for an aggressor block is shown according to an embodiment. As shown in FIG. 5, the IC 500 includes a data hand-off circuit 502, a gating circuit 510, an aggressor block 560, and a victim block 570. It is noted that only those components that are required for the purposes of the description herein are shown in the IC 500, and in fact the IC 500 will include a plurality of other blocks and components. It should be noted that an operating frequency for the aggressor block 560 is the frequency of the first clock signal, and the harmonics of the frequency of the first clock signal may interfere with the operating frequency range of the victim block 570.

The data hand-off circuit 502 includes a FIFO buffer circuit 520, a control circuit 530 and a register 540. The FIFO buffer circuit 520 may be similar to the FIFO buffer circuit 320, or may be an example of the FIFO buffer circuit 320. The control circuit 430 may be similar to the control circuit 230 or may be an example of the control circuit 230, and the occupancy register may be similar to the occupancy register 240 or may be an example of the occupancy register 240.

The write clock of the FIFO buffer circuit 520 is coupled with or connected to the first clock signal, and the data of the aggressor block 560 (see, data write) may be fed to the FIFO buffer (not shown) of the FIFO buffer circuit 520. The control circuit 530 is configured to generate the third clock signal (that is average matched to the first clock signal) that is provided to the read clock of the FIFO buffer. As already described in conjunction with FIG. 4, the third clock signal is generated based on the one or more control signals and random numbers generated from a random number generator 550 of the control circuit 530. The one or more control signals are generated based on comparison of the occupancy level (provided by the register 540) with the thresholds such as T1, T2, T3 and T4. As shown in FIG. 5, the third clock signal is provided to the aggressor block 560 as a clock signal (see, CLK), and its harmonics do not interfere with the operating frequency range of the victim block 570.

Figure 6:
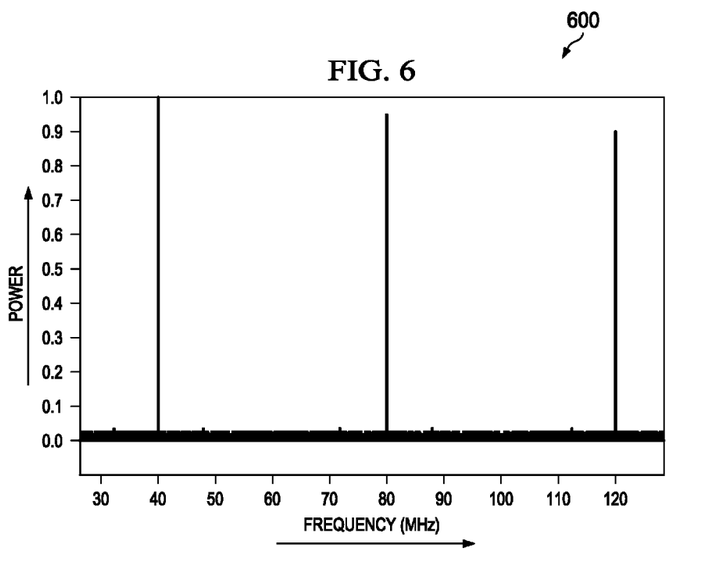
FIG. 6 illustrates a plot of a FFT diagram of the third clock signal according to an embodiment.

Referring now to FIG. 6, a plot 600 of a FFT diagram of a third clock signal is shown, according to an embodiment. In the plot 600, the third clock signal is assumed as 32 MHz averaged clock signal generated from the 40 MHz second clock signal. It is noted that from the FFT diagram that the harmonics of the third clock signal are centered around 40 MHz, 80 MHz and 120 MHz, and so on, and the spectrum is evenly spread for other frequencies. In comparison with the plot 250 of the gated clock signal in an exemplary scenario (see, FIG. 213), where a significant power is also centred at 32 MHz and in turn at 96 MHz, the FFT diagram of the plot 600 do not include any major harmonics component (for example, 96 MHz) that interfere with the operating frequency range (88-108 MHz) of the victim block 570.

Figure 7A:
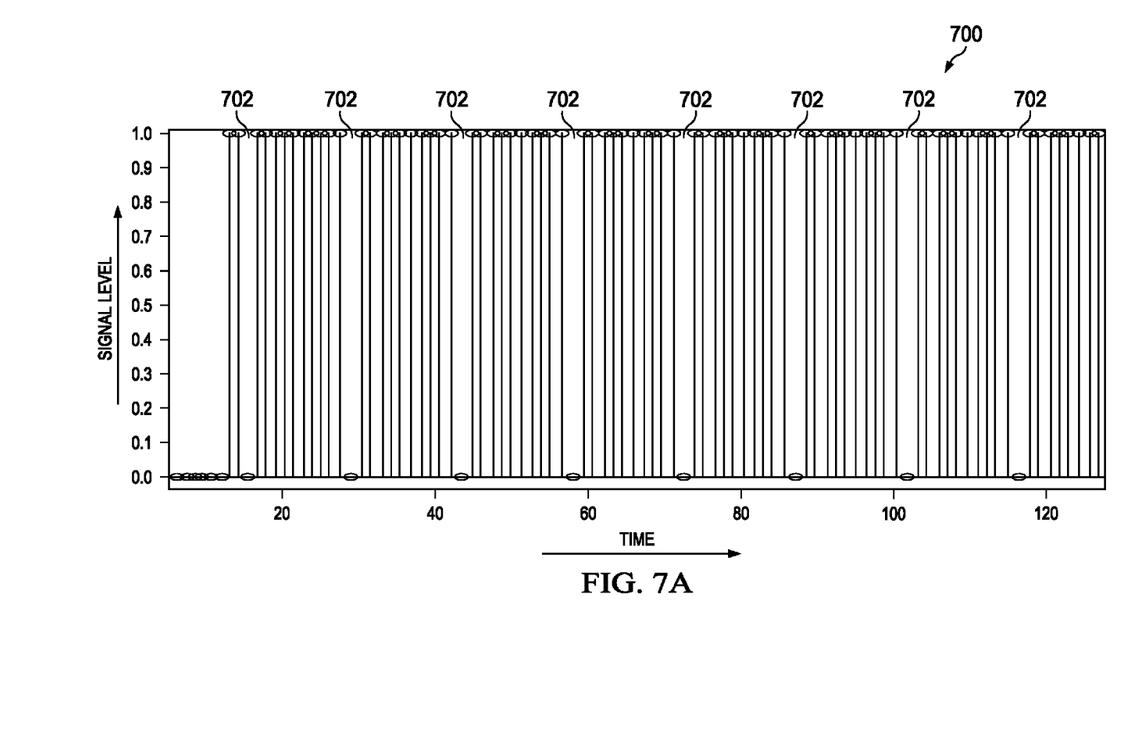
FIG. 7A illustrates a time domain waveform of a gated clock signal according to the exemplary scenario of FIG. 2A.
Figure 7B:
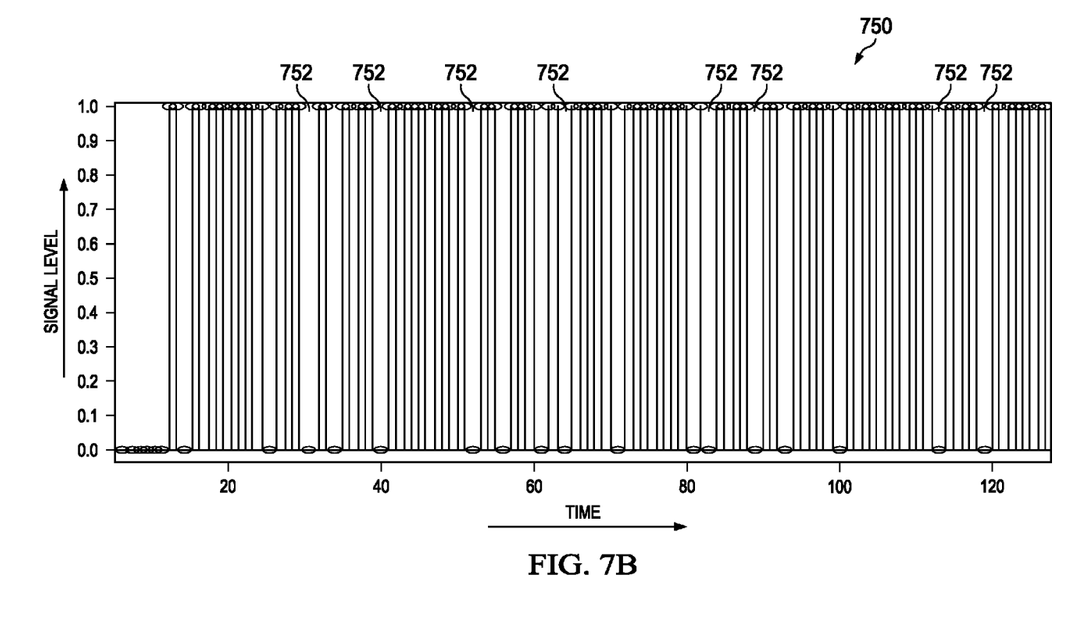
FIG. 7B illustrates a time domain waveform of the third clock signal according to an embodiment.

FIGS. 7A and 7B include time domain waveforms for distinct clock signal with respect to time (X-axis) and amplitude (Y-axis). As shown in FIG. 7A, a waveform 700 represents a time domain pattern indicative of the gated clock signal of FIG. 2A of the exemplary scenario. The gated clock signal of FIG. 2A has a substantially periodic pattern of gating, as there is a consistent time gap between the clock cycles that are gated (see, 702).

By contrast, a waveform 750 represents a random time domain pattern, as there is not a fixed time gap between the clock cycles that are gated (see, 752). The waveform 750 represents a time domain pattern indicative of the third clock signal of embodiments of the present technology (for example, the embodiments described in conjunction with FIGS. 3 and 5). As such, unlike the periodic pattern of the gating in the waveform 700, the waveform 750 provides a more random clock gating pattern that is conducive to the reliable mixed-signal ICs.

The flowchart diagrams that follow are generally set forth as logical flowchart diagrams. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 8:
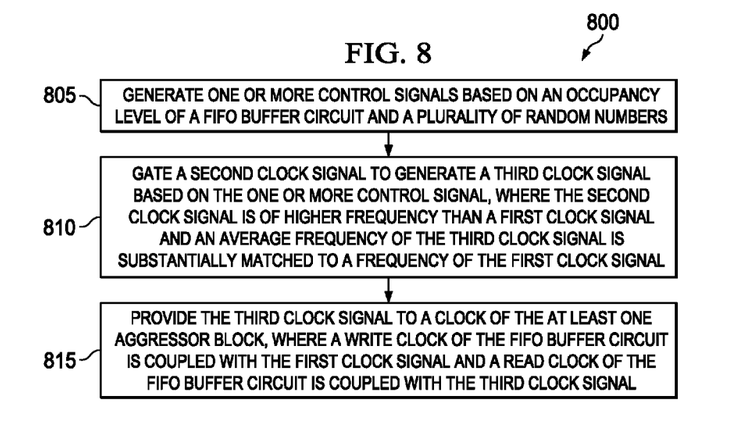
FIG. 8 illustrates a flow diagram of a method for mitigating signal interferences of at least one aggressor block on at least one victim block in an IC according to an embodiment.

FIG. 8 illustrates a flow diagram of a method 800 for mitigating signal interferences of at least one aggressor block on at least one victim block in an IC. The aggressor block is capable of being operated on a first clock signal, and herein signal interferences includes interferes caused by harmonics of the first clock signal with a frequency range of at least one victim block. In an example, the method 800 may be performed in ICs such as the IC 200, or by a clock generation circuit such as the clock generation circuit 300.

At 805, the method 800 includes generating one or more control signals based on an occupancy level of a FIFO buffer circuit and a plurality of random numbers. Examples of the FIFO buffer circuit may include the FIFO buffer circuit 320. At 810, the method 800 includes gating a second clock signal to generate a third clock signal based on the one or more control signal, where the second clock signal is of higher frequency than the first clock signal and an average frequency of the third clock signal is substantially matched to a frequency of the first clock signal. In an embodiment, a write clock of the FIFO buffer circuit is coupled with the first clock signal and a read clock of the FIFO buffer circuit is coupled with the third clock signal. Further, at 815, the method includes providing the third clock signal to a clock of the at least one aggressor block so that the at least aggressor block operate on the third clock signal instead of the first clock signal. As described in reference to FIGS. 2-5, it should be noted that the third clock signal is a clock signal that is average matched to the first clock signal, and its harmonics do not interfere with the frequency ranges of the victim blocks in the ICs.

Without in any way limiting the scope, interpretation, or application of the claims appearing below, advantages of one or more of the exemplary embodiments disclosed herein is to generate a clock signals for different blocks in an IC for reducing signal interference caused by one block to other blocks. Embodiments of the present technology provide a flexible technique for generating co-ex friendly clock signal for various frequency combinations of first and second clock signals. Various embodiments provide random probabilistic gating at each clock cycle of the second clocks signal that provides a quite flat spectrum of the third clock signal. Further, various embodiments also provide controlled random gating of the second clock signal based on various threshold values (both fixed and random) and their comparisons with random numbers. Accordingly, the third clock signal does not cause any harmonics that interfere with the operating frequency range of the victim blocks in the IC.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions are apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A clock generation circuit for mitigating signal interferences of at least one aggressor block being operated on a first clock signal with a frequency range of at least one victim block in an Integrated Circuit (IC), the clock generation circuit comprising:
   a gating circuit configured to perform gating of a second clock signal to generate a third clock signal based on one or more control signals, wherein the second clock signal is of higher frequency than the first clock signal and an average frequency of the third clock signal is substantially matched to a frequency of the first clock signal and wherein one or more harmonics of the third clock signal do not interfere with the frequency range of the at least one victim block;
   a FIFO buffer circuit coupled with the gating circuit, configured to receive the first clock signal as a write clock and the third clock signal as a read clock, the FIFO buffer circuit comprising a read pointer clocked by the third clock signal and a write pointer clocked by the first clock signal; and
   a control circuit coupled with the gating circuit, the control circuit configured to generate the one or more control signals based on an occupancy level of FIFO buffer circuit and a plurality of random numbers, wherein the occupancy level of the FIFO buffer circuit is based on the read pointer and the write pointer.

2. The circuit of claim 1, further comprising a register coupled with the read pointer and the write pointer of the FIFO buffer circuit, the register configured to store the occupancy level of the FIFO buffer circuit.

3. The circuit of claim 1, wherein the control circuit comprises:
   a comparator configured to compare the occupancy level to one or more thresholds; and
   a random number generator generates the plurality of random numbers, wherein the control circuit is configured to generate the one or more control signals based on the comparison of the occupancy level with the one or more thresholds and comparison of the plurality of random numbers with a gating threshold.

4. The circuit of claim 3, wherein the one or more control signals comprises a signal corresponding to one of:
   a gated clock state when the occupancy level is between a first threshold of the one or more thresholds and a second threshold of the one or more thresholds;
   an ungated clock state when the occupancy level exceeds the second threshold; and
   a clock disable state when the occupancy level is less than or equal to a third threshold of the one or more thresholds in the ungated clock state, wherein the first threshold is greater than the third threshold and is smaller than the second threshold.

5. The circuit of claim 4, wherein at least one of the first threshold and the second threshold is randomly selected from one or more values.

6. The circuit of claim 4, wherein the control circuit is further configured to generate a gating signal based on comparison of a random number of the plurality of random numbers to the gating threshold.

7. The circuit of claim 6, wherein the third clock signal is a gated second clock signal in the gated clock state, wherein the gating circuit is configured to gate a cycle of the second clock signal when an asserted gating signal is received at the gating circuit from the control circuit.

8. The circuit of claim 4, wherein the third clock signal is an ungated second clock signal in the ungated clock state.

9. The circuit of claim 4, wherein the third clock signal is a non-switching signal in the clock disable state, wherein the control circuit is further configured to provide the signal corresponding to the gated clock state upon the occupancy level exceeding the first threshold.

10. An integrated circuit, comprising:
    at least one aggressor block being operated on a first clock signal;
    at least one victim block being operated on a frequency range, wherein at least one harmonic of a frequency of the first clock signal interfere with the frequency range;
    a gating circuit configured to perform gating of a second clock signal to generate a third clock signal based on one or more control signals, wherein the second clock signal is of higher frequency than the first clock signal and an average frequency of the third clock signal is substantially matched to a frequency of the first clock signal and wherein one or more harmonics of the third clock signal are non-interfering with the frequency range of the at least one victim block; and
    a data hand-off circuit coupled with the gating circuit, the data hand-off circuit comprising:
        a FIFO buffer circuit configured to receive the first clock signal as a write clock and the third clock signal as a read clock of the FIFO buffer circuit, the FIFO buffer circuit comprising a read pointer clocked by the third clock signal and a write pointer clocked by the first clock signal; and
        a control circuit coupled with the gating circuit, the control circuit configured to generate the one or more control signals based on an occupancy level of FIFO buffer circuit and a plurality of random numbers, the occupancy level of the FIFO buffer circuit based on the read pointer and the write pointer,
    wherein the third clock signal is coupled to a clock of the at least one aggressor block.

11. The integrated circuit of claim 10, further comprising a register coupled with the read pointer and the write pointer of the FIFO buffer circuit, the register configured to store the occupancy level of the FIFO buffer circuit.

12. The integrated circuit of claim 10, wherein the control circuit comprises:
    a comparator configured to compare the occupancy level to one or more thresholds; and
    a random number generator generates the plurality of random numbers, wherein the control circuit is configured to generate the one or more control signals based on the comparison of the occupancy level to the one or more thresholds and comparison of the plurality of random numbers with a gating threshold.

13. The integrated circuit of claim 12, wherein the one or more control signals comprises a signal corresponding to one of:
    a gated clock state when the occupancy level is between a first threshold and a second threshold;

an ungated clock state when the occupancy level exceeds the second threshold; and a clock disable state when the occupancy level becomes less than or equal to a third threshold in the ungated clock state, wherein the first threshold is greater than the third threshold and is smaller than the second threshold.

14. The integrated circuit of claim 13, wherein the control circuit is further configured to generate a gating signal based on comparison of a random number of the plurality of random numbers to the gating threshold.

15. The integrated circuit of claim 14, wherein the third clock signal is a gated second clock signal in the gated clock state, wherein the gating circuit is configured to gate a cycle of the second clock signal when an asserted gating signal is received at the gating circuit from the control circuit.

16. The integrated circuit of claim 13, wherein the third clock signal is an ungated second clock signal in the ungated clock state.

17. The integrated circuit of claim 13, wherein the third clock signal is a non-switching signal in the clock disable state, wherein the control circuit is further configured to provide the signal corresponding to the gated clock state upon the occupancy level exceeding the first threshold.

18. A method for mitigating signal interferences of at least one aggressor block being operated on a first clock signal with a frequency range of at least one victim block in an Integrated Circuit (IC), the method comprising:

generating one or more control signals based on an occupancy level of a FIFO buffer circuit and a plurality of random numbers;

gating a second clock signal to generate a third clock signal based on the one or more control signal, wherein the second clock signal is of higher frequency than the first clock signal and an average frequency of the third clock signal is substantially matched to a frequency of the first clock signal; and providing the third clock signal to a clock of the at least one aggressor block, wherein a write clock of the FIFO buffer circuit is coupled with the first clock signal and a read clock of the FIFO buffer circuit is coupled with the third clock signal.

19. The method of claim 18, wherein generating the one or more control signals comprises:

comparing the occupancy level to one or more thresholds;

generating a plurality of random numbers; and comparing the plurality of random number with a gating threshold, the one or more control signal generated based on the comparison of the occupancy level to the one or more thresholds and comparison of the plurality of random numbers with the gating threshold.

20. The method of claim 19, wherein the one or more control signals comprises a signal corresponding to one of:

a gated clock state when the occupancy level is between a first threshold and a second threshold;

an ungated clock state when the occupancy level exceeds the second threshold; and a clock disable state when the occupancy level becomes less than or equal to a third threshold in the ungated clock state, wherein the first threshold is greater than the third threshold and is smaller than the second threshold.

* * * * *